United States Patent
Florea

(10) Patent No.: US 12,130,233 B2
(45) Date of Patent: Oct. 29, 2024

(54) LASER-ASSISTED TAGGANT EMBEDMENT

(71) Applicant: HONEYWELL INTERNATIONAL INC., Charlotte, NC (US)

(72) Inventor: Catalin Florea, Fort Washington, PA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 311 days.

(21) Appl. No.: 17/579,785

(22) Filed: Jan. 20, 2022

(65) Prior Publication Data

US 2022/0236186 A1  Jul. 28, 2022

Related U.S. Application Data

(60) Provisional application No. 63/141,034, filed on Jan. 25, 2021.

(51) Int. Cl.
| | |
|---|---|
| *G01N 21/64* | (2006.01) |
| *B41M 3/14* | (2006.01) |
| *B42D 25/36* | (2014.01) |
| *B42D 25/465* | (2014.01) |
| *C09K 11/65* | (2006.01) |

(52) U.S. Cl.
CPC ......... *G01N 21/6447* (2013.01); *B41M 3/144* (2013.01); *B42D 25/36* (2014.10); *B42D 25/465* (2014.10); *C09K 11/65* (2013.01)

(58) Field of Classification Search
CPC .... G01N 21/64; G01N 21/6447; B42D 25/36; B42D 25/465; B42D 25/41; C09K 11/65; B41M 3/14; B41M 3/144; B23K 26/0622; B23K 26/18; B23K 26/354; B23K 26/355
See application file for complete search history.

(56) References Cited

U.S. PATENT DOCUMENTS

| | | | |
|---|---|---|---|
| 7,550,197 | B2 | 6/2009 | Kittler, Jr. et al. |
| 9,045,619 | B2 | 6/2015 | Campbell et al. |
| 9,175,398 | B2 | 11/2015 | Conroy |
| 9,493,025 | B2 | 11/2016 | Farmer et al. |
| 9,862,219 | B2 | 1/2018 | Klein |
| 2003/0036201 | A1 | 2/2003 | Nelson et al. |
| 2005/0031838 | A1 | 2/2005 | Lagunowich et al. |
| 2011/0278473 | A1 | 11/2011 | Korson et al. |
| 2015/0283846 | A1 | 10/2015 | Trexler et al. |
| 2016/0125682 | A1* | 5/2016 | Rapoport ............... G07D 7/12  250/206 |
| 2018/0142150 | A1* | 5/2018 | Lau ..................... G07D 7/1205 |

FOREIGN PATENT DOCUMENTS

| | | |
|---|---|---|
| EP | 1430999 A1 | 6/2004 |
| EP | 2857218 B1 | 11/2017 |

OTHER PUBLICATIONS

PCT International Search Report and Written Opinion for Application No. PCT/US2022/070313 dated May 4, 2022.

* cited by examiner

*Primary Examiner* — Jurie Yun

(74) *Attorney, Agent, or Firm* — Lorenz & Kopf, LLP

(57) ABSTRACT

A laser-assisted method embeds luminescent taggant particles in the surface of a substrate to provide a covert method of evaluating the authenticity of articles so treated.

10 Claims, 4 Drawing Sheets

LASER-ASSISTED TAGGANT EMBEDMENT

CROSS-REFERENCE TO RELATED APPLICATIONS

This application claims the benefit of U.S. Provisional Application No. 63/141,034, filed Jan. 25, 2021.

TECHNICAL FIELD

The technical field relates to methods of surface treating a solid substrate, and more particularly relates to methods of fusing particles to a surface of a solid substrate.

BACKGROUND

Value articles are items that are valuable enough for there to be an issue whether an article is authentic. There is an economic incentive for unscrupulous actors to counterfeit such items as coins and other currency, casino tokens, commemorative coins, subway tokens, especially when the face value of the article is high. To frustrate the counterfeiting process, systems are put in place to detect what articles are genuine in a process known as authentication.

Value article authentication can be based on detection of covert or overt aspects of the value article. Overt aspects are discernible to the human eye and some tend to be relatively easy for the bad actor to detect and defeat, although notable exceptions include the case of surface holograms or materials with angle-dependent reflectivity. Covert aspects are those that require custom equipment to detect and which are not immediately apparent to the observer. These include spectral, magnetic, polarization and similar properties of specially designed materials.

Phosphors are known materials that provide luminescent emissions that can be detected to provide security or identification information in a variety of technical fields. Accordingly, it is desirable to find novel ways to incorporate such materials into value articles.

Furthermore, other desirable features and characteristics of the present disclosure will become apparent from the subsequent detailed description and the appended claims, taken in conjunction with the accompanying drawings and this background.

SUMMARY

A method of surface treatment of a solid substrate comprises applying or disposing a composition comprising luminescent taggant particles on the surface of the solid substrate and fusing at least a portion of the particles on the surface with a laser beam. In various embodiments, the method includes directing a laser beam so that it is incident on at least some of the particles on the surface or in the vicinity of at least some of the particles or is incident on at least a portion of the surface where some of the particles are present. Here the laser beam has power sufficient to cause at least a portion of the particles upon which it is incident to be fused into the surface of the solid substrate. In an embodiment, the luminescent taggant particles comprise a rare earth element or a transition metal compound, or both. In various embodiments, the solid substrate is metallic or non-metallic and if metallic it can be ferrous or non-ferrous. In exemplary embodiments, the solid substrate is in the form of a coin, a coin blank or any such precursor.

In other exemplary embodiments, the solid substrate can be a 3D-printed part metallic or otherwise. In yet other exemplary embodiments, the solid substrate can be a plastic like a polymer that can serve as a conduit for polymer currency, driver licenses and other high-value objects.

The incident laser beam can be directed so that it fuses articles into the entire surface or into less than the entire surface of the solid substrate. For example, the laser beam can be directed onto the surface loaded with particles so as to form grooves or other features that immobilize the luminescent particles. The method can contain the further step of subjecting the metal surface to mechanical processes such as cleaning, rinsing, air drying or ultrasound treatment, to remove particles not fused into the surface by the directed laser beam.

In another embodiment, a value article comprises a metal substrate and a luminescent taggant composition fused (or otherwise intimately constrained or embedded) into a surface of the substrate with laser energy. The taggant composition contains a phosphor, which can comprise a transition metal or a rare-earth element or a combination thereof, in addition to a host material.

A method for authenticating a value article is also provided that includes detecting light emission and its salient characteristics with purpose-built detectors. The light results from the emission provided by the excitement of luminescent taggant particles that are incorporated into the surface of the value article. The taggants are incorporated in a regular pattern or in an irregular or random pattern. The pattern corresponds to the pattern of the features created by the laser treatment of the surface containing the taggant particles.

In an embodiment, the taggants are incorporated in a pattern that will be containing information about the authenticity of the article, where the particular locations of the taggant particles within the pattern can be used to encode information. Examples of patterns include a bar code-like pattern, a 2D matrix-like code, or a spiral of constant or variable pitch.

In this method, the features that form the pattern can have dimensions (i.e., length or width as measure in a two-dimensional plane of the surface of the substrate) on the order of about 0.1 microns to about 100 microns, about 1 to 100 microns, or from about 10 to about 100 microns and surface roughness of about 0.05 to about 10 microns as needed to provide appropriate constraint on the taggant particles as well as to assist with the detection and authentication process.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1A:
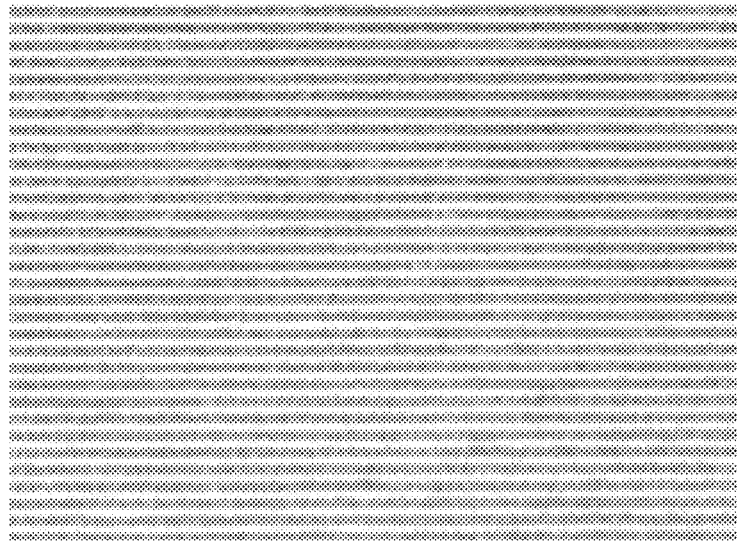
FIGS. 1A and 1B show images of actual linear and spiral grating areas, respectively, in a silver substrate.

The following detailed description is merely exemplary in nature and is not intended to limit the present disclosure or the application and uses thereof. Furthermore, there is no intention to be bound by any theory presented in the preceding background or the following detailed description.

Substrates

In the current teachings, luminescent particles are disposed on the surface of a substrate before undergoing a process of laser embedment. The substrates take on a number of forms depending on their end use. The substrate can be made of any material that is compliant with a laser-assisted embedment process. The substrate can be metallic or non-metallic, and if metallic it can be ferrous or non-ferrous.

Non-metallic substrates include glasses and ceramics as well as polymeric materials, which can be thermoplastic or thermoset. The glasses can be glass objects or glass-based components or sections of an object having different materials (e.g., a thermoplastic matrix incorporating a glass component or insert). For example, the glass objects can range from standard glass bottles (marked for recycling applications or for brand protection) to specialized containers like medical vials (for Pharma track-and-trace regulations, for example). Thermoplastic substrates include polyester, polyolefin (BOPP), polyamide, cellulosic, polystyrene, polyacrylic, thermoplastic polyurethane (TPU), polypropylene, polyethylene, polylactic acid, polycarbonate, and the like. Thermoset materials include epoxy, polyurethanes, melamine, formaldehyde resins, amino resins, glass reinforced plastics, carbon fiber reinforced plastics, and the like.

Metal substrates include ferrous metals, non-ferrous metals and combinations thereof. Suitable ferrous metals include iron, steel, and other alloys. Suitable non-ferrous substrates include gold, silver, platinum, copper and copper alloys, aluminum and aluminum alloys, titanium and titanium alloys and other similar base metals and combinations.

Value Articles

Coins and other similar value articles such as coin blanks, tokens, medallions, gaming chips, commemorative coins, and "paper" currency are made from a wide variety of substrate materials. They are often metal or metallic alloy and are usually disc shaped. Some are bullion coins being made of valuable metals like platinum, gold and silver. Value articles used as currency have polymeric substrates, and these derive their economic value not from the value of the materials they are made of, but rather on the value placed on it by the issuing authority, be it a government or a private entity. Yet another example are collectable coins issued by a variety of entities, collectibles of value due to either material or scarcity or both. Other value articles serve a security function, such as id cards, driver's licenses, passports, and the like.

The substrate can take the form of the coin or other value article, such as currency, tokens, chips, and medallions. In an embodiment, the substrate forms a disc that is a blank or a precursor of a coin. The blank will be further modified through embossing, edging and similar modifications specific to the minting process.

The substrate can be solid or formed by several layers in thickness and several concentric, radial structures. The substrate can be formed also of fused powder particles as employed in the 3D printing process of metal parts.

Particles of various types can be incorporated on the surface or within the surface interface of such value articles. Here the surface interface means the actual surface of the article and at least a part of interior of the object next to the surface. It is to be expected that at least some luminescent particles that are fused by the laser beam "into the surface" will be constrained on the very surface, while other particles will be found to be constrained at least partially beneath the surface of the article, embedded in the so-called surface interface. There they function to alter the electromagnetic or optical signature of the value article and thereby enable discrimination of non-authentic articles. "Electromagnetic or optical signature" refers to all salient parameters that describe the emission, reflection, refraction or dispersion of light from a single or a collection of luminescent particles.

Luminescence

Luminescence is either fluorescence or phosphorescence. When a luminescent pigment molecule is excited by preferably light energy of a specific wavelength, it enters an excited energy state from which then reverts to its original, equilibrium state by emitting a portion of the absorbed energy as light. The emitted light is typically of a different wavelength then that of the absorbed light. The luminescence process is characterized by the emission wavelength but also by certain time constants which describe how fast a collection of luminescent particles will revert to the ground, equilibrium state.

Fluorescence is a phenomenon that occurs when a substance absorbs radiation of a certain wavelength, or group of wavelengths, and re-emits photons of a different wavelength Typically, molecules that display fluorescence, and so are considered luminescent taggants or taggant particles—are of two types—organic compounds with a high degree of conjugated unsaturation and extended cloud structure, or inorganic compounds where it is relatively easy to promote an electron to a higher vacant energy level (usually a d- o f-level), and the molecule may be excited to a higher vibrational and rotational energy state. The spectrum of the emitted light is called the emission spectrum. Due to the conservation of energy, the emitted light is almost always at a higher wavelength.

Taggants

The word taggants refers to particles or chemical compositions that are difficult to duplicate or detect and that can be identified based on a physical property thereof such as luminescence. Like a fingerprint, taggants can help to identify articles of value, such as currency, passports, or driver licenses. As used here, taggants find use in a variety of security applications where a value article such as a bullion coin can be provided with luminescent materials to provide a covert aspect to an authentication process. The term is used herein to describe the role of the phosphors or luminescent particles that are embedded onto a substrate using the laser-assisted method described.

Luminescent Taggant Particles

Luminescent particles used as taggants herein are regarded as being solid particles that have a substantially spherical or other mostly three-dimensional, regular or irregular shape and emit visible light under the influence of electromagnetic radiation. That is, the particles are capable of photoluminescence, and, in particular of fluorescence. They are stimulated to emit visible or invisible light when they are exposed to and absorb radiation, including ultraviolet radiation, visible radiation or near-infrared and infrared radiation. These particles are also known as phosphors and there is a large amount of literature and disclosure that go in detail about the nature and behavior of this class of materials.

Phosphors are typically doped organic or inorganic materials, such as oxides, sulfides, halides, garnets, phosphates, selenides, oxysulfides and so on. They are typically crystalline in nature to enhance the photoluminescence process.

The dopant choices spread most of the transition and rare-earth elements. The phosphors often contain combinations of dopants where one or more dopants provide the initial absorption and one or more different dopants provide the emission.

Non-limiting examples include doped ZnS, doped $Y_2O_3$, doped Y2O3S, doped YAG, and doped $Y_3Al_5O_{12}$. Examples of dopants include but are not limited to Cu, Er, Yb, Nd, Eu, Ho, Tm, Dy and on the like.

Luminescent taggant particles also influence a wide range of electromagnetic radiation in case it interacts with it. Polarization, reflection, wavelength dispersion are well known phenomena that can be used to provide a component to the authentication process based on taggant particles.

Deposition of Taggant Particles on Surface of Substrate

In embodiments, taggant particles are deposited/coated or otherwise disposed on the surface of the substrate prior to laser treatment. In embodiments, the taggant particles are uniformly distributed on the surface with a uniform thickness, i.e., with a thickness variation of +/−10% across the substrate. In embodiments, a taggant composition including the taggant particles and, optionally, a carrier is prepared and applied to the surface of the substrate to form a taggant layer before or during laser treatment. Suitable carrier includes a liquid solvent or gel capable of evaporation prior to the laser treatment so as to achieve substantially uniform distribution of the taggant particles across the substrate with substantially uniform thickness. The taggant composition can be deposited via spraying, brushing, pipetting, spin-coating or any similar method. It is to be appreciated that in other embodiments, the taggant particles may be deposited non-uniformly to provide areas of taggant particles and areas free from taggant particles on the surface of the substrate. In further embodiments, the taggant is deposited to the surface of the substrate via transfer from a solid carrier that is brought preferably in intimate contact with the surface of the substrate on which the taggant is to be deposited (much like attaching a label with an adhesive side to the substrate that the taggant will be embedded into). In this embodiment, the solid carrier may be loaded with taggant particles (for example the taggant is embedded in paper or adhesive layer as the solid carrier, or the like). After laser treatment, taggant particles are transferred into the surface of the substrate, and then the solid carrier is removed. Suitable materials for the solid carrier enable the taggant-based functionality of the primary substrate to be maintained after the removal of the solid carrier. For example, the solid can be a label made of paper and/or organic adhesive which either burn upon laser exposure with residue readily washable from the surface of the substrate or otherwise cleaned off the surface of the substrate. Alternatively, ink including the taggant particles is deposited on the surface of the solid carrier and deposited on the surface of the substrate prior to laser treatment.

Laser-Assisted Embedment of Taggant Particles

Taggant particles are incorporated into a solid substrate by a process of laser embedment. In an embodiment, laser light of sufficient energy and power and having an appropriate wavelength is directed to be incident on the substrate directly onto or at least in the vicinity of taggant particles that have been disposed on the substrate. The energy of the laser beam interacts with the taggant particles and the substrate surface in such a way as to create features on the surface. These features are in the form of patterns cut into the surface (and also below the actual surface in the surface interface defined above) by action of the laser beam. As the laser beam is directed at the surface in the pattern of the features, the taggant particles are fused into or embedded into the surface of the articles. The pattern specifics will depend in part on the nature of substrate, the type of laser used and the particle size distribution of the taggant that it is intended to be embedded into the surface of the substrate. Regular or random patterns of dots, straight or curved lines, are just a few examples of suitable structures. At least some of the taggant particles are confined or immobilized into that substrate, either directly within the surface features or in their vicinity.

The term "fused" is used herein to refer to the embedment process described above. The term is meant to describe how at least some of the taggant particles are embedded or otherwise intimately constrained to the surface or the resulting surface features. As demonstrated in the examples, the particles are bound at least to the extent that wiping, rinsing, air drying, and ultrasound treatment does not remove or dislodge them. Furthermore, the embedded taggant is also resistant with respect to the industry-standard tape test, which is a test used typically to check coatings adhesion. For the industry-standard tape test, a tape piece of high tackiness is repeatedly applied to and removed from the tested surface; the surface is tested before and after the tape treatment to assess any changes in surface characteristics of interest—in this case, taggant presence as determined via measurement with a taggant-specific detector. Though the current teachings are not limited by any theory of laser—matter interaction, it is felt that the embedment can be viewed at least in part as mechanical in nature, where local surface distortion arising from the interaction of the laser beam with the substrate traps taggant particles through clamping or pinning.

The laser embedment process can be thought of as a mechanical surface manipulation carried out in such a way that the chemistry of the taggant particles subjected to the laser treatment is not modified. When the substrate is a soft metal (like gold, silver, platinum), relatively moderate laser power density is enough to distort the surface of the substrate without damaging the luminescent taggant particles. It could be that the laser does diminish or otherwise modify the luminescence properties of at least some of the taggant particles. When the laser beam is applied as illustrated in the Examples section, at least some of the particles survive the treatment and luminesce enough that they can be detected.

A wide range of lasers and laser writing conditions can be employed and adapted to the type of material substrate used. Without limitation, a laser can be of continuous-wave type although a preferred example is a pulsed laser type that has a pulse width of microseconds to femtoseconds. The pulse repetition is of importance as it will determine the amount of energy deposited at a given location onto the surface of the substrate material, which in turn will determine how fine o a pattern can be created on the surface. The preferred size of the features present in the pattern (either regular or random) is dependent on the taggant particle size since the goal is to trap, embedded or otherwise constrain the particles to the surface. Typically, the repetition rate correlates with the how fast the laser beam is moved from one spot to another. Exemplary ranges are from few Hz to kHz for pulse repetition rate, and from about 3000 mm/s to about 1 mm/s for the laser beam speed on the surface. The laser wavelength is chosen such that the interaction with the substrate material is optimized to yield the preferred pattern feature size through efficient absorption and heat dissipation. A preferred example is a laser emitting at 1.06 microns.

For illustration, grooves or other regular features can be created onto the surface of the solid substrate as shown in the Figures and detailed in the Examples section. Linear grating areas and spiral grating areas, for example, can be produced having a grating half-period of about 1 to 50 microns and surface roughness of about 0.05 to 10 microns. Large taggant particles can be trapped in between the grating lines, while smaller particles can be trapped within the rough surface of the grating area either along the lines or at the bottom of the space between the lines. Taggant particles as small as 1 micron or less can therefore be trapped within regular or random patterns.

EXAMPLE

Figure 1B:
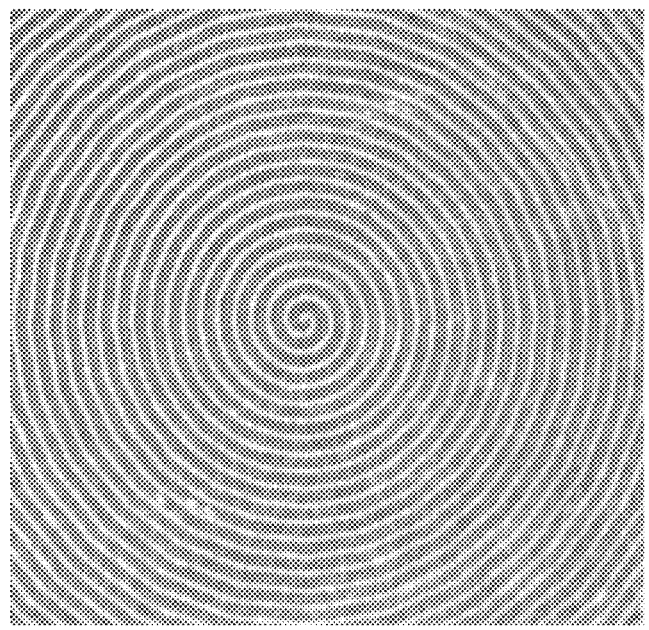

Laser-assisted embedment of taggant particles into a silver blank is illustrated in the Figures. The taggant was doped YAG powder, a proprietary taggant made by Honeywell International of Morris Plains, N.J. The taggant particles were about 2 microns in diameter. A nanosecond-pulse laser was used, where the laser wavelength was about 1 micron. The writing speed was a few 10's of millimeters per second, and no significant effort was spent to optimize the roughness of the surface features or the resolution of the pattern. Two pattern types were studied: linear gratings with lines separated by 50 and 100 microns (exemplarily illustrated in FIG. 1A), and spiral patterns with row separation of 50 and 100 microns (exemplarily illustrated in FIG. 1B). Surface roughness in the patterned areas was estimated to be on the order of a micron.

A proprietary detection system developed by Honeywell International of Morris Plains, NJ was used to excite the taggant and record the fluorescence in order to assess the presence or absence of taggant on the surface, in areas that were or were not modified by the laser. The system contains the excitation source that matches the taggant absorption, as well as the detector that corresponds to the fluorescence emission of the taggant.

The surface cleaning procedure consisted of vigorous manual wiping with lens tissue soaked in isopropyl alcohol, followed by ultrasound cleaning (also known as sonication) in isopropyl alcohol for 5 minutes, and then by air drying with an air bulb.

Figure 2:
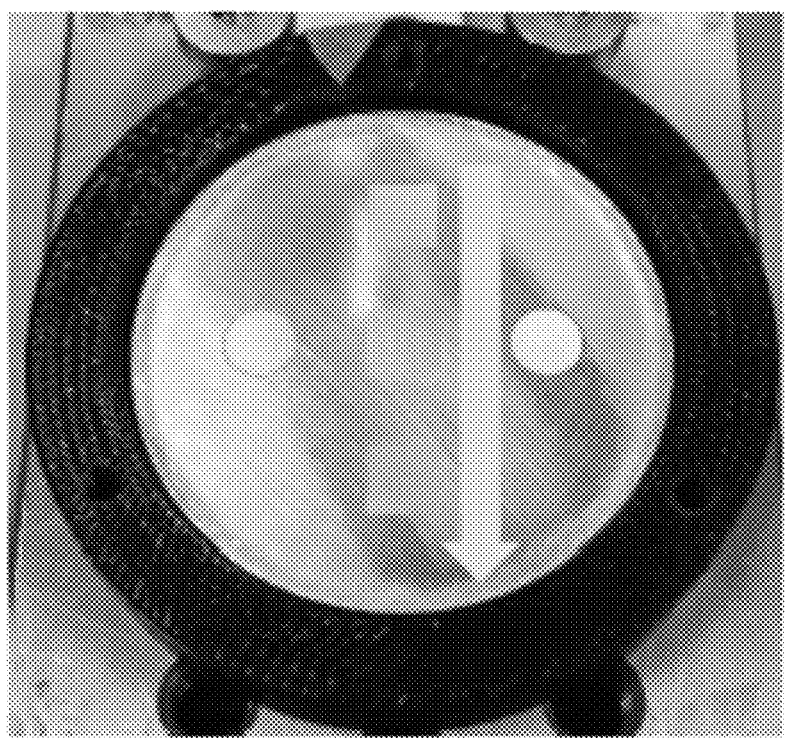
FIG. 2 shows a silver blank with laser-patterned areas, blank being held in a holder for handling during experimental work.

A first blank, defined here as blank #1, was first coated with taggant and then laser-patterned. The actual blank is shown in FIG. 2. The taggant was deposited in an estimated few-tens of microns thick layer, without spending any significant effort to achieve uniform thickness or uniform distribution on the surface. The blank was tested for presence of taggant on its surface before and after laser patterning, as well as after cleaning. On surfaces that were laser-patterned, after cleaning there was fluorescence signal detected. On surfaces that were not laser-patterned, after cleaning there was no fluorescence signal detected.

Figure 3:
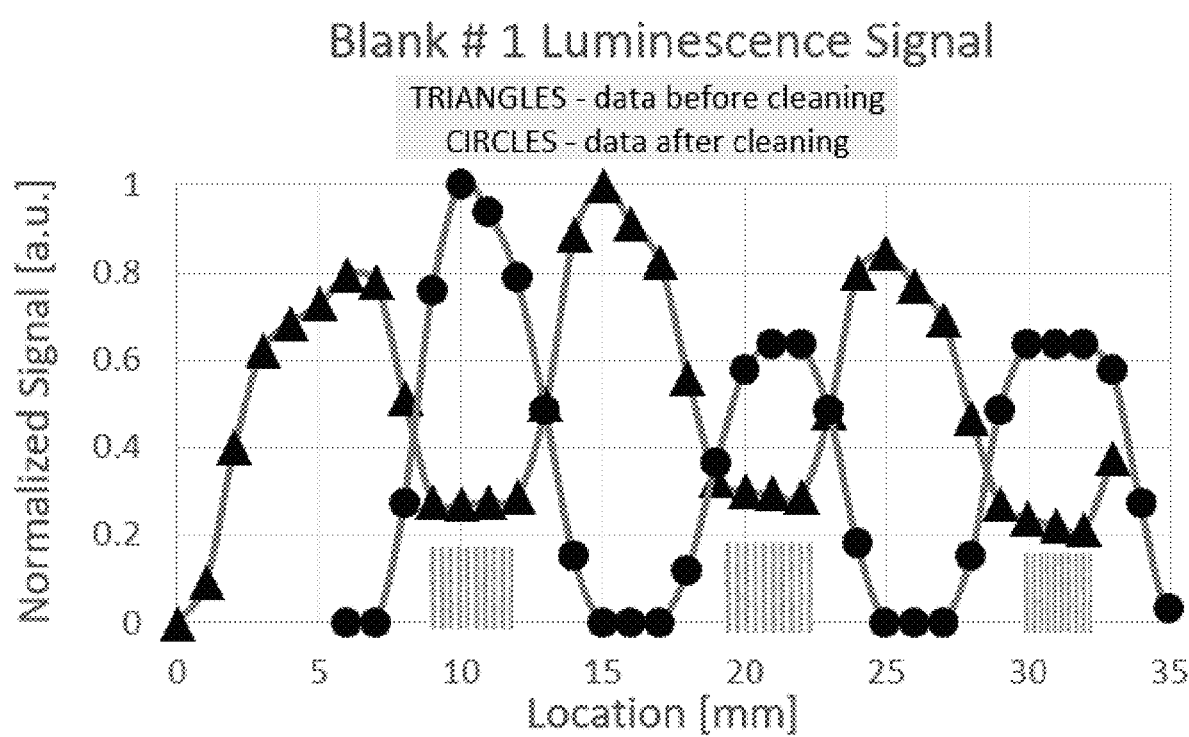
FIG. 3 illustrates the data obtained from silver blank #1 where taggant presence in laser-patterned areas is demonstrated after cleaning.

This is illustrated in FIG. 3 where the detector fluorescence data is shown as the detector was moved along a line crossing three different gratings in the direction illustrated by the arrow drawn in FIG. 2. The silver blank #1, as-patterned and before cleaning, shows taggant signal in the areas patterned as well as in the areas not patterned, but after cleaning the fluorescence signal is present only in the laser-patterned areas.

The possibility that taggant just got superficially stuck inside the patterned area due to the sample handling and cleaning, and that the cleaning procedure was not robust enough was also addressed by a second demonstration.

Figure 4:
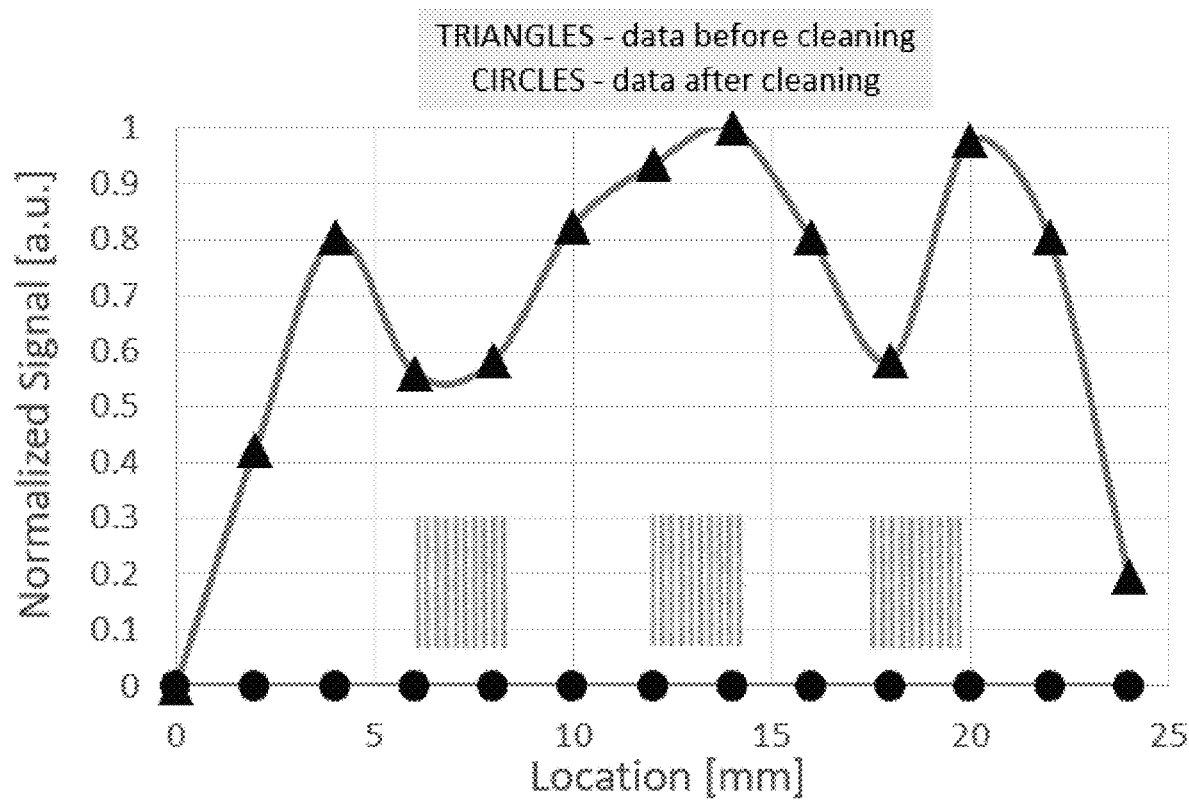
FIG. 4 illustrates the data obtained from silver blank #2 where taggant absence in laser-patterned areas is demonstrated after cleaning.

A second blank, defined here as blank #2, was laser-patterned first and then coated with taggant in equivalent manner as described previously. A measurement was again performed similar to the one for blank #1 and the results are shown in FIG. 4.

Initially there is luminescence signal in the laser-patterned areas as well as in the areas without laser pattern. After cleaning no luminescence signal was found on areas that were laser-patterned, and as expected no luminescence signal was found on areas that were not laser-patterned. Essentially, taggant particles did not just simply get stuck in the laser-patterned areas but rather it was necessary for the laser patterning to occur while the taggant particles are on the surface for embedment to occur.

These findings demonstrate that laser patterning of a surface previously treated with taggant particles will promote taggant embedment in the surface which is resistant to significant cleaning efforts, including sonication.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It being understood that various changes may be made in the function and arrangement of elements described in an exemplary embodiment without departing from the scope of the present disclosure as set forth in the appended claims.

What is claimed:

1. A method of surface treatment of a solid substrate comprising disposing a composition comprising luminescent taggant particles on the surface of the substrate; and
   fusing at least a portion of the luminescent taggant particles on the surface of the substrate by directing a laser beam that is incident on at least a portion of the surface and where some of the taggant particles are present; wherein the laser beam has sufficient power to cause at least a portion of the particles upon which it is incident to be fused into the surface of the solid substrate, the laser beam being directed onto the taggant particles and onto the surface of the substrate to generate local surface distortions that pin, clamp or otherwise constrain the luminescent taggant particles into the surface of the substrate; and
   removing the taggant particles not fused into the surface by the directed laser beam.

2. The method according to claim 1, wherein the substrate comprises a metal.

3. The method according to claim 1 wherein the substrate comprises a polymer.

4. The method according to claim 1 wherein the substrate is in the form of a sheet suitable for driver license, a sheet suitable for banknote production, a 3D printed part, or a coin or a coin blank.

5. The method according to claim 1, wherein the laser beam is directed so as to constrain particles into less than an entire surface of the substrate.

6. The method according to claim 1, wherein the laser beam is directed onto the particles and onto the surface to generate features comprising the luminescent particles in the surface.

7. A value article comprising a substrate and a luminescent taggant composition constrained into a surface interface of the substrate with laser energy.

8. The value article according to claim 7, wherein the taggant composition comprises a transition metal.

9. The value article according to claim 7, wherein the taggant composition comprises a rare-earth element.

10. The value article according to claim 7 selected from the group consisting of a coin, a coin blank, a token, a medallion, a gaming chip, a commemorative coin, and currency.

* * * * *